Jan. 20, 1942.   J. H. McADOO   2,270,458
HEADLIGHT CONTROL MECHANISM
Filed Oct. 19, 1939
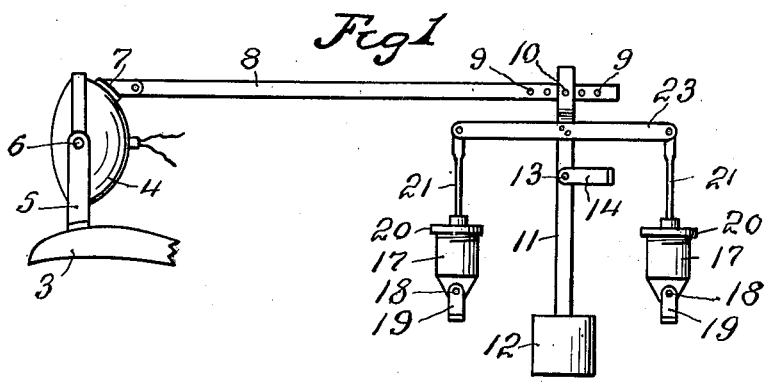
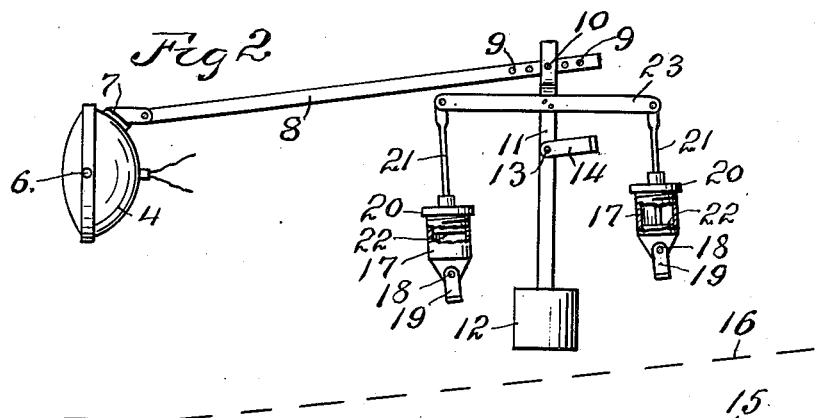
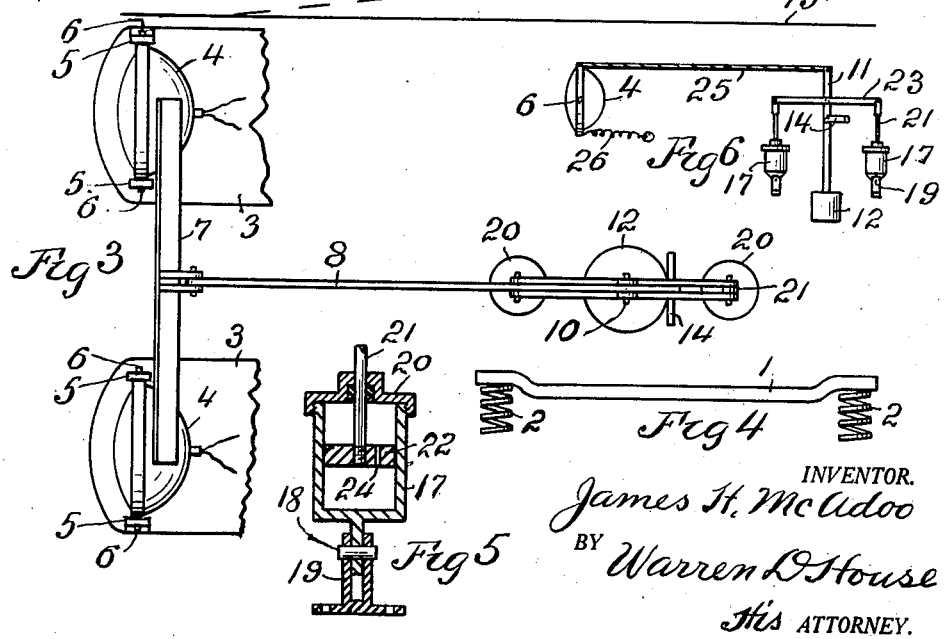
INVENTOR.
James H. McAdoo
BY Warren D. House
His ATTORNEY.

Patented Jan. 20, 1942

2,270,458

UNITED STATES PATENT OFFICE 2,270,458

HEADLIGHT CONTROL MECHANISM

James H. McAdoo, St. Joseph, Mo.

Application October 19, 1939, Serial No. 300,203

1 Claim. (Cl. 240—62.2)

My invention relates to improvements in headlight control mechanisms for automobile headlights. It relates particularly to the type of headlight control mechanisms in which the headlights are pivoted on a horizontal transverse axis and are swung to different angles, or retained in certain positions by a weighted pendulum.

One of the objects of my invention is the provision of novel means by which the pendulum swings the headlights to and holds them in certain positions.

A further object of my invention is in the provision of novel means for yieldingly resisting the swinging of the pendulum, whereby the headlights will not be subjected to short oscillations when the car is passing over a rough road.

Another object of my invention is the provision of novel means by which the angles to which the headlights are swung by the pendulum relative to the angles assumed by the pendulum may be adjustably varied.

A further object of my invention is the provision of a novel dashpot mechanism by which the swinging of the pendulum is yieldingly resisted.

Still another object of my invention is the provision of a headlight control mechanism of the kind described, which is simple, cheap, strong, durable, not likely to get out of order, which can be readily applied to cars now in use, and which is efficient in its operation.

The novel features of my invention are hereinafter fully described and set forth.

In the accompanying drawing, which illustrates my invention:

Fig. 1 is a side elevation, showing one form of my invention in which the headlights are swung by an adjustable bar pivotally connected to the headlights and to the pendulum, parts of the car being shown and parts omitted.

Fig. 2 is a side elevation of the form shown in Fig. 1, showing the positions of the headlight operating mechanism, when the car is descending a hill, or when the car is loaded lightly at its rear and the body inclines forwardly, downwardly.

Fig. 3 is a plan view of what is shown in Fig. 1.

Fig. 4 is a reduced side elevation of a usual type of a spring supported car frame.

Fig. 5 is an enlarged vertical central sectional view of one of the dashpots, shown in Fig. 1.

Fig. 6 is a reduced side elevation of a modification in which the swinging of the headlights is effected by a flexible cord-like member connecting the headlights and the pendulum, and a spring.

Similar characters of reference designate similar parts in the different views.

1 designates a usual car frame supported at its front and rear by coil springs 2. 3 designates the usual fenders forming part of the body carried by and in effect integral with the frame 1.

Referring to Figs. 1, 2 and 3, 4 designates each of two headlights pivoted on a horizontal transverse axis by means of two pairs of upright brackets 5 respectively mounted on the two fenders 3, each pair of brackets respectively pivotally supporting oppositely disposed trunnions 6 provided on the side edges of the headlight 4 which is disposed between the brackets of the pair.

Connecting the headlights 4 so that they will swing together, is an angle bar 7, to which is pivoted the front end of a rearwardly extending bar 8, the rear end portion of which is provided with a longitudinal row of holes 9, each of which is adapted to receive a pivot pin 10, which extends through a hole provided through the upper portion of a pendulum bar 11 fastened at its lower end to a weight 12.

The pendulum bar 11 below the pivot pin 10 is pivoted by means of a pivot pin 13, on an axis parallel with the axis of the headlights 4, to a bracket 14 rigidly supported in any convenient manner upon the frame 1 of the car.

When the car is loaded lightly at the rear, and the frame tilts forwardly downwardly with reference to the road, which is level, as indicated by the solid line 15 in Fig. 2, the pendulum will swing to the vertical position shown, and with the pivot pin 10 located, where shown in the bar 8, will, through the bar 8, swing the connecting bar 7 and the headlights 4 to the straight ahead position.

If the driver of the car desires that the light shall be projected further forwardly on the road, he will adjust the pivot pin 10 in one of the holes 9 in advance. Or, if he should desire the light thrown nearer on the road, he will adjust the pivot pin 10 in one of the holes 9, farther back in the bar 8.

If the car is so loaded at the rear as to incline upwardly forwardly, when the car is on a level road, the pendulum bar 11 will swing to the vertical, thus through the bars 8 and 7 swinging the headlights 4 to throw the light at the desired angle, when traveling on a level road.

With the pivot pin 10 adjusted, to the position shown in Fig. 1, and the car travels downwardly on an inclined road, as indicated by the dotted line 16 in Fig. 2, the pendulum bar 11 will swing to the vertical, thus swinging the headlights, to the position shown in Fig. 2, thus throwing the light farther ahead on the road.

If the car travels up the inclined road 16, the pendulum bar 11 in swinging to the vertical, will move the bar 8 forwardly, thus swinging the headlights 4 so as to throw the light ahead nearer to the car. From the above, it will be noted that the headlights are swung simultaneously in the same direction as the pendulum, and that they are swung thereby in one direction when the frame tilts forwardly downwardly, and in the opposite direction when the frame tilts rearwardly downwardly, and to angles from the horizontal dependent upon the adjustment on their axis through the bar 8.

For yielding resisting the swinging of the weighted pendulum 11—12, and of the headlights 4, so that the headlights will not make rapid short oscillations, when traveling on a rough road, a dashpot mechanism is provided, comprising the following described parts.

Two dashpots 17 are respectively pivoted by two pivot pins 18 to two brackets 19 rigidly supported on the frame, by suitable means, the pins 18 being parallel with the pivot pin 13 on which the pendulum bar 11 is pivoted.

The dashpots 17 are disposed normally upright, and contain a fluid, preferably oil, the dashpots having removable screw cap covers 20, through which respectively reciprocate two piston rods 21, of two pistons 22, which are respectively reciprocatively fitted in the oil of the two dashpots 17.

The upper ends of the piston rods 21 are respectively pivoted to a cross member, comprising a bar 23, at opposite sides of the pendulum bar 11. Said bar 23 is rigidly fastened at its middle portion to the pendulum bar 11 above the pivot pin 13.

By means of this construction, when the pendulum bar 11 oscillates, the pistons 22 will simultaneously move in opposite directions. Thus even though considerable oil may be lost from the dashpots 17, the pistons will travel back and forth in the remaining oil. By disposing the dashpots normally vertically, with the screw cap covers 20 above, very little oil will be lost.

To restrict the speed of movement of the pistons 22 in the dashpots 17, the pistons may be made sufficiently loose in the dashpots, to provide the proper cross sectional area of by-pass for the oil. Or, as shown, each piston may have through it a by-pass opening 24, Fig. 5, having the desired cross sectional area, to obtain the slowness of travel of the pistons desired.

In the modified form, shown in Fig. 6, the construction corresponds with that shown in Figs. 1 to 3, excepting that in lieu of the bar 8, for connecting the headlights 4 with the pendulum bar 11, a flexible cord-like member, such as a metal ribbon or a wire cable 25 is fastened at one end to the pendulum bar 11 above the pivot pin 13, and at its other end to the upper part of one of the headlights 4.

When the pendulum bar 11 swings in one direction, it will, through the member 25 swing the headlights in one direction. To swing them in the opposite direction, when the pendulum retracts, a coil spring 26 is fastened at one end to the lower part of one of the headlights 4, its other end being fastened to some fixed part, supported by the car frame.

Many modifications of my invention, within the scope of the appended claim, may be made without departing from the spirit of my invention.

What I claim is:

In a headlight control mechanism, in combination, a car frame, a headlight, means pivotally supporting said headlight on said frame on a horizontal transverse axis, a pendulum, means pivotally supporting said pendulum on said frame on an axis parallel with said axis, means connecting said pendulum with said headlight by which the latter may be circumferentially adjusted on its axis relatively to said pendulum and by which said headlight will be swung in opposite directions when said frame is tilted in opposite directions, a cross member rigidly fastened to said pendulum, two upright dash pots containing liquid, means pivotally supporting said dash pots on axes parallel with the axis of said pendulum, and two pistons reciprocative in said liquid in said dashpots and pivoted to said cross member at opposite sides respectively of said pendulum by which said pistons will move simultaneously in opposite directions and swinging of said pendulum will be yieldingly resisted.

JAMES H. McADOO.